(12) United States Patent
Lahetkangas et al.

(10) Patent No.: US 7,474,874 B2
(45) Date of Patent: Jan. 6, 2009

(54) LOCAL BROWSING

(75) Inventors: Keijo Lahetkangas, Oulu (FI); Kai Mustonen, Oulu (FI)

(73) Assignee: Nokia Corporation, Espoo (FI)

( * ) Notice: Subject to any disclaimer, the term of this patent is extended or adjusted under 35 U.S.C. 154(b) by 264 days.

(21) Appl. No.: 10/185,372

(22) Filed: Jun. 28, 2002

(65) Prior Publication Data

US 2004/0162022 A1    Aug. 19, 2004

(51) Int. Cl.
*H04B 7/00*    (2006.01)
(52) U.S. Cl. .................. 455/41.2; 455/41.1; 455/456.1; 455/456.3; 455/414.3; 370/312; 370/315; 370/390; 370/400
(58) Field of Classification Search ....... 455/41.1–41.3, 455/456.1, 456.3, 414.1, 414.3, 45.1, 414.36; 709/201, 218, 238, 249; 342/450, 457, 462–464; 370/310.2, 312, 313, 315, 328, 338, 352, 370/254, 390, 400, 428
See application file for complete search history.

(56) References Cited

U.S. PATENT DOCUMENTS

| | | | | |
|---|---|---|---|---|
| 6,104,712 | A * | 8/2000 | Robert et al. | 370/389 |
| 6,449,638 | B1 * | 9/2002 | Wecker et al. | 709/217 |
| 6,690,657 | B1 * | 2/2004 | Lau et al. | 370/315 |
| 6,754,188 | B1 * | 6/2004 | Garahi et al. | 370/328 |
| 2002/0062388 | A1 * | 5/2002 | Ogier et al. | 709/238 |
| 2002/0126708 | A1 * | 9/2002 | Skog et al. | 370/522 |
| 2002/0174026 | A1 * | 11/2002 | Pickover et al. | 705/26 |
| 2004/0022221 | A1 * | 2/2004 | Chwieseni et al. | 370/338 |

FOREIGN PATENT DOCUMENTS

| | | |
|---|---|---|
| EP | 0 913 965 | 5/1999 |
| EP | 1 133 113 | 9/2001 |
| WO | 2000/078010 | 12/2000 |
| WO | 0217285 | 2/2002 |

OTHER PUBLICATIONS

English-language translation of Office Action from Korean Patent Office in Patent Application No. 7021191/2004, dated Oct. 21, 2006, 2 pages.

* cited by examiner

*Primary Examiner*—Sujatha Sharma
(74) *Attorney, Agent, or Firm*—MacDonald Illig Jones & Britton LLP; Robert M. Bauer, Esq.

(57) ABSTRACT

There is disclosed a method of transmitting information between a plurality of devices comprising: transmitting information associated with a first terminal from said first terminal; receiving said transmitted information at an at least one second terminal; and selectively transmitting said information from said at least one second terminal.

33 Claims, 9 Drawing Sheets

LOCAL BROWSING

FIELD OF THE INVENTION

The present invention relates to the distribution of user or terminal specific information in a local area between devices, which are enabled to transmit user or terminal specific information. The invention relates particularly, but not exclusively to the establishment of an ad hoc local network amongst such devices to facilitate local browsing.

BACKGROUND TO THE INVENTION

People obtain information from their adjacent neighbourhood with their senses, e.g. sight and hearing. It is not usual for people to have any real-time information about their neighbourhood beyond the information provided by such senses.

Information networks are not optimized to provide local information efficiently, and it is difficult for people to access information networks while they are moving. This is because information networks are not optimised to provide local information efficiently.

When a person is on the move, carrying a mobile telephone or wireless equipped personal data assistant (PDA) for example, there are limited methods for 'pushing' information in certain places. For example, adverts may be 'pushed' to a mobile telephone, i.e. sent to the receiver using for example SMS or WAP push functionality, where receiving user action is not needed. Similarly there are limited opportunities for a user of a mobile terminal to provide a provider of local services with information relating to their interests, or to access local bulletin boards.

Increasingly, mobile (and fixed) devices are equipped with short-range radio communication means, such as Bluetooth, WLAN or infra-red (IR), to avoid cable connections in local communication. These short-range links are specifically provided for local communication. However the use of these short-range communication links requires a degree of technical competence from a user, which they may not possess, or may not be inclined to spend time implementing.

Therefore, at present, these short-range communication links are not extensively used. Where they are used, they are used for short-range point-to-point communication between two devices, e.g. between any ones of: a laptop computer; a cellular phone; a PDA; a printer; a Bluetooth access point; a Bluetooth user device; or a digital camera.

It is an object of the present invention to provide a solution to one or all of the above-stated problems.

SUMMARY OF THE INVENTION

According to the present invention there is provided a method of transmitting information between a plurality of devices comprising: transmitting information associated with a first terminal from said first terminal; receiving said transmitted information at an at least one second terminal; and selectively transmitting said information from said at least one second terminal.

The steps of transmitting information preferably utilise a short-range communication link. The short-range communication link may be one of: a Bluetooth link; an infra-red link; or a WLAN link.

The method may further comprise receiving said transmitted information from said at least one second terminal at an at least one third terminal. The information transmitted from the first terminal may be re-transmitted by a limited number of further terminals. The information may be transmitted from the first terminal with a hop count. On receipt of transmitted information the hop count may be reduced by one, 8. The transmitted information may be re-transmitted if the hop count is non-zero.

Transmitting information may comprise broadcasting information from a source terminal to a destination terminal. Transmitting information may comprise fetching information at a destination terminal from a source terminal Each terminal may include an information index for storing an index of information stored in the terminal, wherein on receipt of a transmission the transmission is accepted in dependence on the information contained in the transmission not being identified in the information index.

Each terminal may include an information index for storing an index of information transmitted by the terminal, wherein a retransmission of the information is prevented in dependence on the information index indicating the previous transmission of the information.

The information index may comprise identifier and version information for said information Said information may be a Proximity Home Page. Said additional information associated with a Proximity Home Page may be fetched from the associated user terminal. Additional information associated with a Proximity Home Page may be fetched from the internet. Received information may be stored in the terminal memory.

Stored information may be removed from the device memory in dependence on predefined parameters The stored information may be removed from the device memory in dependence on an elapsed time from being stored; an elapsed time from being refreshed; an elapsed time from being accessed; or an elapsed time set in a stored Proximity Home Page.

According to a second aspect of the present invention there is further provided a communication system comprising a plurality of terminals, in which: a first terminal is adapted to transmit information associated with said first terminal; a second terminal is adapted to receive said transmitted information; and said second terminal is further adapted to selectively further transmit said information.

Each terminal may include a short-range communication link adapted to transmit and receive. The short-range communication link may be one of: a Bluetooth link; an infra-red link; or a WLAN link. The communication system may comprise a third terminal adapted to receive said information from said second terminal.

A limited number of further terminals may be adapted to re-transmit information received from the first terminal Each terminal may be adapted to transmit information with a hop count.

Each terminal may be adapted to reduce the hop count by one on receipt of transmitted information. Each terminal may be adapted to prevent re-transmission of the information if the hop count is non-zero. Each terminal may be adapted to transmit information by broadcasting information as a source terminal and receive information as a destination terminal. Each terminal may be adapted to fetch information as a destination terminal and transmit information as a source terminal.

Each terminal may be adapted to include an information index in a memory thereof for storing an index of information stored in the memory, wherein on receipt of a transmission the transmission is accepted in dependence on the information contained in the transmission not being identified in the information index.

Each terminal may be adapted to include an information index in a memory thereof for storing an index of information transmitted by the terminal, wherein a retransmission of the information is prevented in dependence on the information index indicating the previous transmission of the information.

Said information index may comprise an identifier and a version information for said information. Sid information index may comprise an identifier and a version information for said information. Said information may be a Proximity Home Page.

Each terminal may be adapted to fetch additional information associated with a Proximity Home Page from the associated user terminal Each user terminal may be adapted to fetch additional information associated with a Proximity Home Page from the internet. Each terminal may include a memory for storing received information.

Each terminal may be adapted to remove stored information from the device memory in dependence on predefined parameters.

Each terminal may be adapted to remove stored information from the device memory in dependence on an elapsed time from being stored; an elapsed time from being refreshed; an elapsed time from being accessed; or an elapsed time set in a stored Proximity Home Page.

According to a further aspect of the present invention there is provided a communication terminal including: a transmitting means adapted to transmit information associate with the terminal to other terminals; and a receiving means adapted to receive information associated with other terminals from other terminals, the terminal being further adapted to selectively re-transmit the received information.

The information transmitted by the terminal or received at the terminal may include an identification of the number of times the information may be retransmitted.

The receiving means may be adapted to reduce the value of the retransmission identification number on receipt of the information.

The terminal may selectively re-transmit the received information in dependence upon the value of the retransmission identification number.

The terminal may re-transmit the received information if the retransmission identification number is non-zero.

BRIEF DESCRIPTION OF THE DRAWINGS

The invention will now be described by way of reference to the accompanying figures, in which.

DESCRIPTION OF PREFERRED EMBODIMENTS

The invention is described herein by way of reference to a particular example. However the invention is not limited in its applicability to the described example.

Figure 1:
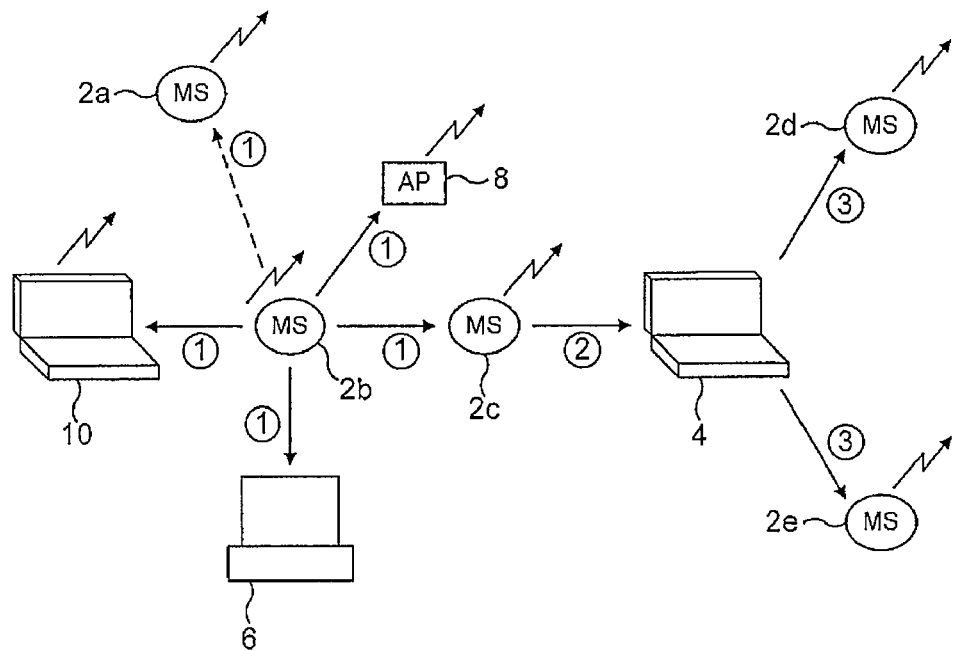
FIG. 1 is a block diagram illustrating an example implementation of the present invention.

Referring to FIG. 1, there is illustrated a typical scenario within which the present invention may be advantageously utilised. Referring to FIG. 1, there is shown a plurality of mobile stations $2a$ to $2f$, a portable computer 4, a desktop computer 6, an access point (AP) 8, and a personal data assistant 10.

Each of the mobile stations $2a$ to $2f$, the PDA 10, and the AP 8 are provided with means for RF communication with, for example, a radio network such as mobile wireless cellular communication network.

Each of the mobile stations $2a$ to $2f$ may comprise a mobile telephone for communication with a cellular communication system. The access point 8 may be a wireless local area network (WLAN) access point, such as a IEEE 802.11 access point.

For the purposes of the present example for describing the present invention, it is assumed that each of the devices is equipped with a short-range communication link, such as a Bluetooth interface, an infra-red interface, or an IEEE 802.11 (WLAN) interface. The type of short-range communication is not important to the present invention. However it will be understood that in the following description for any two devices to communicate they must have compatible communication interfaces.

Figure 2:
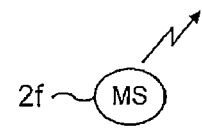
FIG. 2 illustrates an example implementation of a device interface according to an embodiment of the present invention.
Figure 2:
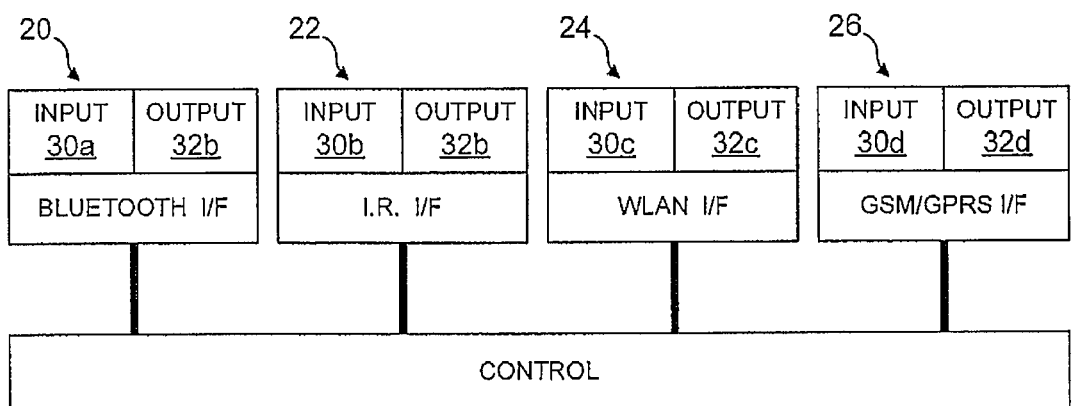

Referring to FIG. 2, there is illustrated in block diagram form a device, such as laptop computer 4, including a plurality of communication interfaces. Although not shown in FIG. 1, for the purposes of FIG. 2 it is assumed the laptop computer 4 includes an RF communication interface for communicating with a wireless cellular communications network. Only the elements of the device associated with external communication are shown in FIG. 2.

Referring to FIG. 2, the laptop 4 is provided with three short-range communication interfaces: Bluetooth interface 20, infra-red interface 22, and WLAN interface 24. The laptop is further provided with a GSM/GPRS interface 26. Each of the interfaces is associated with respective input means $30a$ to $30d$ for receiving signals transmitted from an appropriate interface of a different device. Each of the interfaces is also associated with a respective output means $32a$ to $32d$ for transmitting signals to an appropriate interface of a different device. Each of the interfaces 20, 22, 24 and 26 is connected to a control block 34 of the laptop.

The control of the communication interfaces to transmit and receive signals is well-known to one skilled in the art, and is not described in any further detail herein.

For the purposes of describing an example implementation of the present invention with reference to FIG. 1, it is assumed that each of the devices shown therein is provided with at least one of the short-range communication interfaces 20, 22, 24. However, the invention in its broadest sense is not so limited, and as will become apparent in the following each device may be provided with any type of short-range communication device.

Further for the purposes of the present invention, it is assumed that each device is associated with a 'Proximity Homepage'; specific to that device ('Terminal Proximity Homepage') or specific to a user of that device ('User Proximity Homepage'). A homepage specific to a user can still be considered as associated with the device/terminal, as the user is at least temporarily associated with the device/terminal in use.

The Proximity Homepage is similar to an Internet-homepage, but is preferably suitable for a mobile telephone handset display, and may be stored in the handset. Where a device is a computer, e.g. computer 6, the Proximity Homepage may be a simplified version of an Internet homepage.

Figure 3:
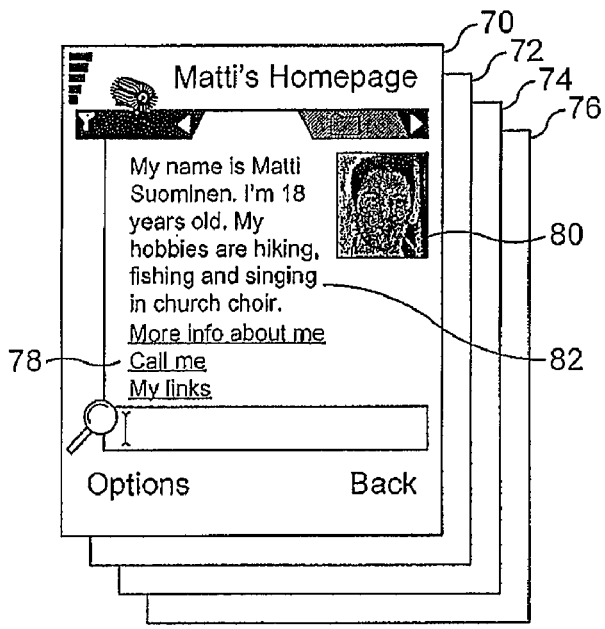
FIG. 3 illustrates an example of a proximity Home Page.

An example of a proximity homepage and its structure is shown in FIG. 3. The homepage, designated by reference numeral 70, may include some general introductory text 82, or alternatively a main menu. In the example shown in FIG. 3, the homepage additionally includes a photograph 80 of the user, and links 78, such as links to Internet pages, a direct call link containing the user's telephone number, or links to other pages of the proximity homepage. Associated pages of the proximity homepage include a bigger photograph 72 of the user, a sub-page 74 (or sub-pages) containing more information about the user, and a page of the user's favourite links 76. Each of the associated pages is preferably accessible via links on the main home page 70. The sub-pages are fetched separately by pointing to the appropriate sub-page link.

The proximity home page is preferably organised in the form of a hypertext document containing any files. The size of the file is limited according to the specific implementation. In a preferred embodiment the file size is limited to 30 kilobytes.

As illustrated by reference numeral 78 in FIG. 3, the pages may contain links to the Internet. Internet pages are fetched by using the Internet connection of the node (mobile terminal) over the cellular network or by using, for example, a Bluetooth/WLAN access point.

The proximity pages can be used for: sharing private end user's profile data with other users; commercial advertising; or public (cities, local authorities etc.) information sharing. More generally, the Proximity Homepage may be considered to be user information or terminal information. Specifically the user or terminal information, in the preferred embodiments of the present invention, is information, which a user of a terminal wishes to (or is willing to) make available to the users of other terminals in the local area. The information is preferably local information.

Figure 4:
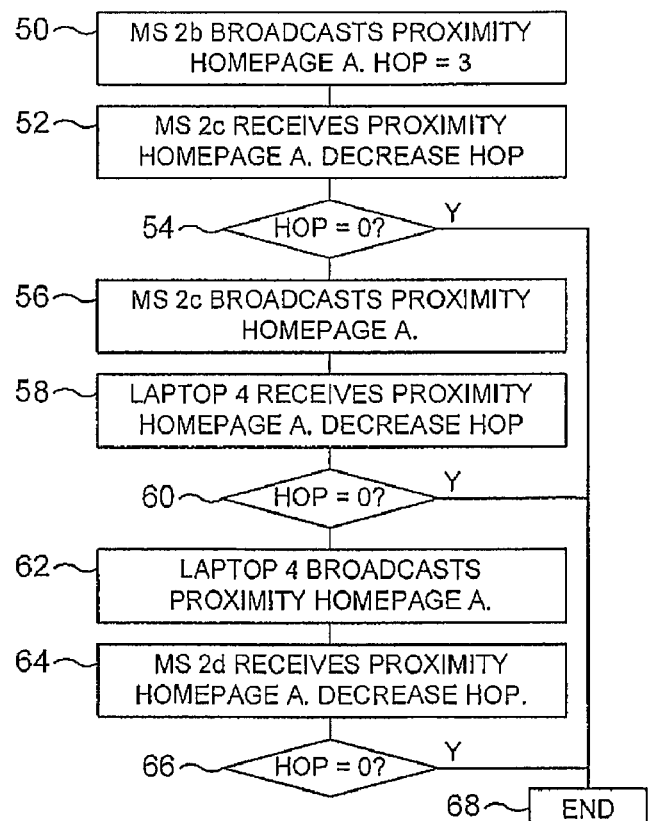
FIG. 4 illustrates the method steps in performing an embodiment of the present invention.

An example implementation of the present invention will now be described by way of reference to the scenario of FIG. 1, with further reference to the method steps of FIG. 4. The example of FIG. 4 illustrates the case where proximity homepages are broadcast between terminals.

In this example there is followed a transmission originating from mobile station 2b. However it will be understood by one skilled in the art from reading the following description that simultaneous transmissions may originate from any one of the devices shown in FIG. 1.

The mobile station 2b has associated therewith a Proximity Homepage, e.g. Proximity Homepage A. A mode of operation is enabled at the mobile station 2b such that the Proximity Homepage A is automatically broadcast periodically from the mobile station 2b. This mode of operation may be selected by the user from a menu system provided on the display of the mobile station, or may be set in a default mode of operation.

For the purposes of describing the present example, it is assumed that all the devices of FIG. 1 have enabled such a mode of operation.

In accordance with a preferred aspect of the present invention, the Proximity Homepage A is broadcast on a short-range communication interface of the mobile station 2b.

In accordance with a further preferred aspect of the present invention, the Proximity Homepage A is broadcast with a 'hop count' set by the mobile station 2b. The hop count indicates, as discussed in further detail hereinbelow, the number of devices or terminals through which the Proximity Homepage A may be transmitted As discussed in further detail hereinbelow, each device receiving a broadcast Proximity Homepage preferably broadcasts it itself, thus 'spreading' the Proximity Homepage amongst a neighbourhood. However, as discussed further hereinbelow, the 'spreading' of the Proximity Homepage is preferably limited.

The step of broadcasting the original Proximity Homepage A from mobile station 2b is represented by step 50 in FIG. 4. For the purposes of this example it is assumed the hop count is initially set to 3. Although the hop count may be set by the mobile station 2b, it is preferably a pre-configured system parameter.

All of the devices within range of the short-range broadcast transmission from mobile station 2b receive Proximity Homepage A as a compatible communication interface. Thus devices 2c, 8, 6 and 10 receive Proximity Homepage A. Although device 2a is within range, it does not include a compatible communication interface and therefore does not receive Proximity Homepage A.

Thus the broadcast by mobile station 2b may be considered to be 'tier 1' of the 3 hop broadcast. Referring specifically to mobile station 2c, for example, and referring to step 52 of FIG. 4, once the broadcast signal is received the hop count associated therewith is decremented by 1, as one hop is now complete.

In a step 54 mobile station 2c determines whether the hop count is zero. If the hop count is zero then all hops are complete and no further broadcasts of the Proximity Homepage A take place, and the method ends in step 68.

In the present example in step 54 the hop count is 2, and the method moves on to step 56. In step 56 mobile station 2c broadcasts Proximity Homepage A on its short-range communication link. In the example of FIG. 1 only laptop 4 is within range, and receives the Proximity Homepage A on its compatible communication interface. Although the mobile station 2b is also within range, it can ignore the broadcast signal by recognising the Proximity Homepage A as being previously broadcast therefrom as stored in its Proximity Homepage index.

The Proximity Homepage Index comprises information identifying each Proximity Homepage stored in the terminal, and the version of it. The version information may comprise, for example, a date and/or time stamp, and/or a rolling version number.

The step 58 represents receipt of Proximity Homepage A by mobile station 2c. The mobile station 2c decreases the hop count of the received signal by 1. The broadcast from mobile station 2c to laptop 4 can be considered to be 'tier 2' of the 3 hop broadcast.

In a step 60, the laptop 4 determines whether the hop count is zero. As the hop count is now equal to 1, the method moves onto step 62.

In step 62, the laptop 4 broadcasts Proximity Homepage A on its short-range communication link. In the example of FIG. 1, this broadcast signal is received by mobile stations 2d and 2e on compatible short-range communication interfaces.

This broadcast signal is also received by mobile station 2c, which takes no action responsive thereafter as it recognises the identity of Proximity Homepage A as being in its active Proximity Homepage index. Preferably each device or terminal may be provided with a Proximity Homepage index. The Proximity Homepage Index may be used to keep a list of all active Proximity Homepages in the device, and therefore can be used to avoid any duplicate broadcasts.

The step 64 represents receipt of Proximity Homepage A by mobile station 2d. The mobile station 2d decreases the hop count of the received signal by 1. The broadcast from laptop 4 to mobile stations 2d and 2e can be considered to be 'tier 3' of the 3 hop broadcast.

In a step 66, the mobile station 2d determines whether the hop count is zero. In this example the hop count is zero, and the method ends in step 68. Steps 64 and 66 are performed similarly for mobile station 2e.

In general, for all devices at tier n of an n hop broadcast, no further broadcasts take place.

Thus in accordance with the present invention, as discussed hereinabove, each user preferably receives the Proximity Homepages of all nearby users, and the pages can be browsed off-line with the browser of the user's device.

The use of hopping enables connections to be built up beyond the physical limitations of a specific short-range communication interface. Thus a short-range communication technique limited to communication over tens of meters can be used to establish communication over hundreds of meters, for example.

It should be noted that the Proximity Homepage may be hopped between devices using different short-range communications interfaces. For example, the laptop 4 may receive the broadcast signal from mobile station 2c on a Bluetooth communication interface; but transmit to mobile station 2d on an infra-red interface, and mobile station 2e on a WLAN interface.

Although the present invention has been described in relation to an embodiment in which Proximity Homepages are broadcast from terminals, the invention is not limited to such an arrangement. In an alternative arrangement, a receiving terminal may make a decision as to which files (i.e. Proximity Homepages) are transmitted between terminals (or nodes). This is particularly the case where transmission of data is point-to-point between two node, rather than broadcast generally.

The decision as to whether to transmit files is preferably made by the 'receiving' terminal using the information from the list of proximity pages received from any neighbours, and by using any information contained in already received proximity pages. Such a principle may be referred to as a 'sucking' or 'fetching' principle, where the terminal itself decides which pages to take form its neighbours. The list of proximity pages provided by a transmitting terminal preferably contains an exact identifier of the proximity page and the version information (i.e. a date/time stamp or rolling version number) of the proximity page.

In general, the transmission of pages between nodes may happen on the basis of the following principle:

1 1. In a first possible implementation, a terminal (or node) broadcasts its pages to it's local area, and all neighbours listen for all possible broadcasts. Each terminal or node then collects the different proximity home pages from the different broadcast signals. In this broadcasting scenario, there is usually no feedback provided to the broadcasting node as to whether the transmission has succeeded or not. Transmission success is ensured by repeating the transmission at certain intervals. However, one potential drawback with this transmission technique is that transmissions may be unnecessarily repeated, especially in static situations.

1 2. In a second possible implementation, the terminals or nodes exchange their Proximity Homepages on point-to-point connections, using normal point-to-point protocols. To eliminate unnecessary transmission of pages, a 'sucking' principle may be applied as discussed above. This implementation may lead to several transmission sessions of the same Proximity Homepage, but does not create repeat transmission s in a static situation.

1 3. In a third possible implementation, elements of the first and second implementations are combined. One embodiment is based on the second implementation, with the addition of terminals or nodes eavesdropping on the communications between other terminals, and collecting from those transmissions a list of Proximity Homepages and associated pages that the terminals does not have. This implementation may minimise any transmissions.

Other possible implementations of the present invention will be apparent to one skilled in the art.

Figure 5:
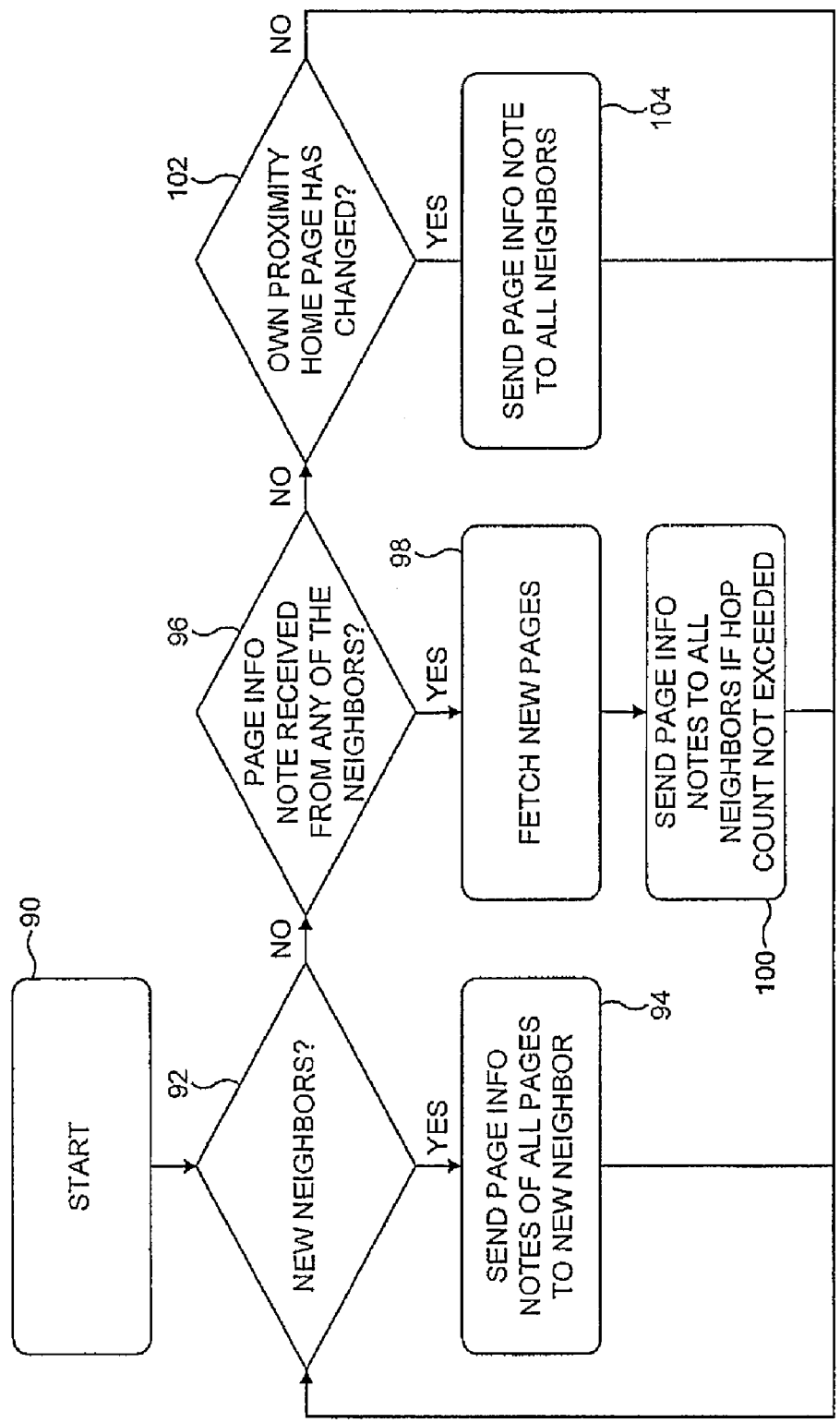
FIG. 5 illustrates the method steps performed in a device implementing an embodiment of the present invention.

A further specific embodiment of the present invention, from the perspective of any one of the devices of FIG. 1, is described hereafter with reference to FIG. 5. FIG. 5 illustrates a main routine featuring delivery of the Proximity homepages in the network. Updates of proximity home pages are also delivered in accordance with the main routine.

Following a start-up step 90, in a step 92 the device determines whether the device has any new neighbours. This is determined by receipt of broadcast messages from neighbours.

If new neighbours are detected, in a step 94 the device sends all page information notes associated with its proximity homepage to the new neighbours. In addition, the device requests the list of proximity pages from the new neighbours.

If no new neighbours are detected in step 92, then in a step 96 it is determined whether any page information notes have been received from any of the existing neighbours. If any such notes have been received, then in a step 98 the new pages associated with such notes are fetched from the associated neighbours. In a step 100, the page information notes detected in step 96 are sent onto all neighbours provided the hop count for any of those neighbours has not been exceeded.

If it is determined in step 96 that no page information notes have been received from neighbours, then the device determines in step 102 whether its own proximity home page has changed. If it has changed, then in a step 104 the updated page information is sent to all neighbours. If no changes have been made, then the routine returns to step 92. After each of the steps 94, 100, and 104 the routine returns to step 92.

As mentioned hereinabove, in step 92 the device also requests the list of Proximity pages from any new neighbouring node. The delivery of pages from neighbouring nodes is preferably carried out as a background communication.

After receiving the list of proximity pages from all the neighbours. the node (device) requires those proximity pages that it does not have in its own memory. The proximity pages are requested from that node that has the shortest hop count to the source of the Proximity page.

When a node updates it's own Proximity page or it has downloaded a new Proximity page from another node, it updates the Proximity page Index. A node (device) may request proximity page lists from its neighbouring nodes Preferably a technique is provided for removing pages from the proximity homepage index in the device. This may be implemented on a time basis. For example, if a particular page has not been updated for a certain amount of predetermined time, it may be deleted. This may also be implemented on the basis that once the memory is full, any new pages downloaded automatically delete the oldest pages. The user may be able to mark certain pages as protected, to prevent deletion or overwriting.

If any pages include location and/or mobility information, and the device knows it's own location and/or mobility information, this information may be used in a decision to determine if the page should be removed or not. For example, pages which are associated with devices/applications which are not in a predefined proximity are, for example a 500 meter radius, may be removed from the index of pages. The predefined proximity area may be a system parameter. Pages associated with fixed stations in the proximity area may be stored for longer times, as the probability of them being relevant is higher than pages associated with mobile nodes.

The location/mobility information may also be used when the decision is made as to whether to fetch pages, as described in embodiments hereinabove. For example, fast moving or "too far" pages may not be fetched, as they may not include relevant information about the proximity area. This principle may also save unnecessary transmissions.

The system designer can optimise fetching and removing parameters for optimal purposes. Other possible implementations of fetching and removing principles will be apparent to one skilled in the art.

Referring once again to FIG. 1, it can be seen that by utilising the present invention an ad hoc network is created amongst devices 6, 8, 10, 2b, 2c, 2d, 2e and 4, despite the fact that some of these devices are outside of short-range communication link with each other. In such an ad hoc network each device, which forms a mode of the network, knows its immediate neighbour only. No device is aware of the topology of the whole network.

Figure 6:
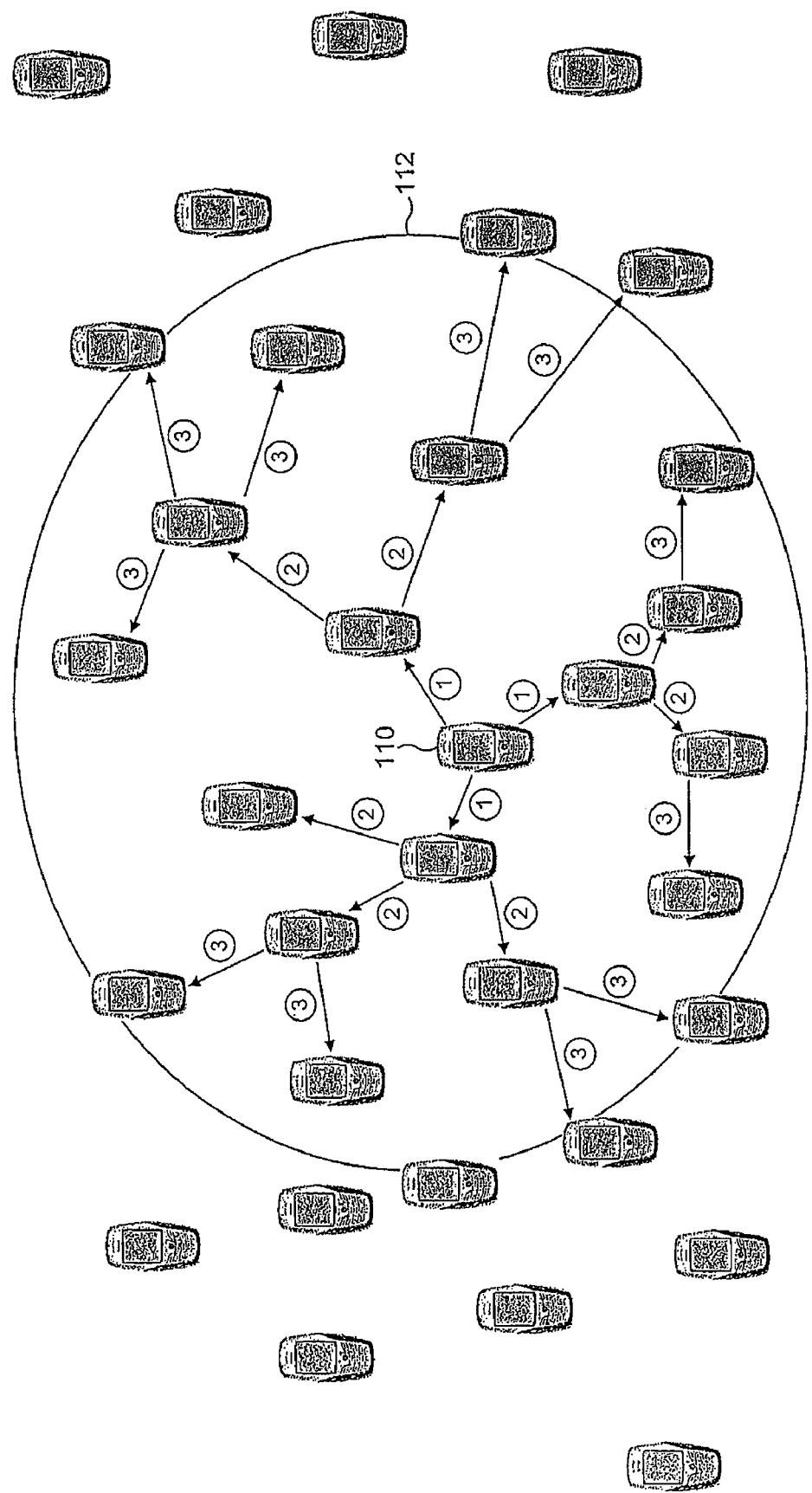
FIG. 6 illustrates the creation of an ad hoc network in accordance with the present invention.

The implementation of an ad hoc network in such a way is illustrated in FIG. 6. As can be seen, the hop originates at a device 110. On the basis of a 3-hop implementation a network covering the area 112 is created. The ad hoc network is preferably created using Bluetooth radios in the terminals. The Proximity homepages are automatically multicasted in the ad hoc network to the n-hop proximity. Each terminal in the ad hoc network receives all the Proximity homepages from the n-hop environment.

If all of the devices are Bluetooth devices, then they may organise themselves in a Piconet network.

Figure 7A:
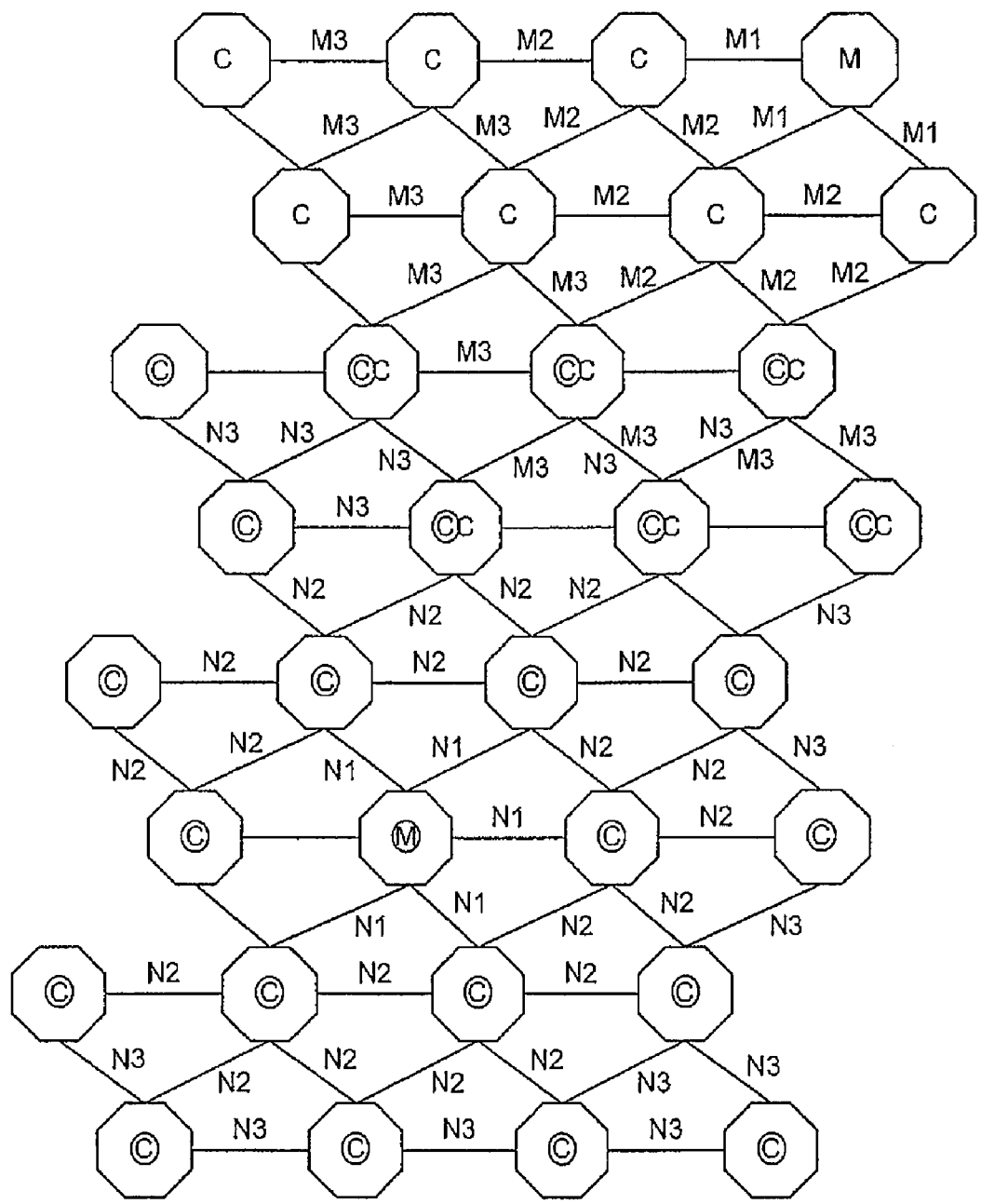
FIGS. 7(a), 7(b) and 7(c) illustrate examples of the creation of further ad hoc networks in accordance with embodiments of the present invention.

FIG. 7(a) illustrates local browsing implemented in a 3-hop mesh network, where information is transmitted as broadcasts to all neighbouring nodes. The master nodes (m,n) illustrate nodes sending the information to the network. Clients (c) receive the information over the $1^{st}$ tier (m1, n1), $2^{nd}$ tier (m2, n2) and $3^{rd}$ tier (m3, n3) hops. The achieved n-hop coverage area of the masters (m, n) are illustrated with circled and non-circled letters.

Figure 7B:
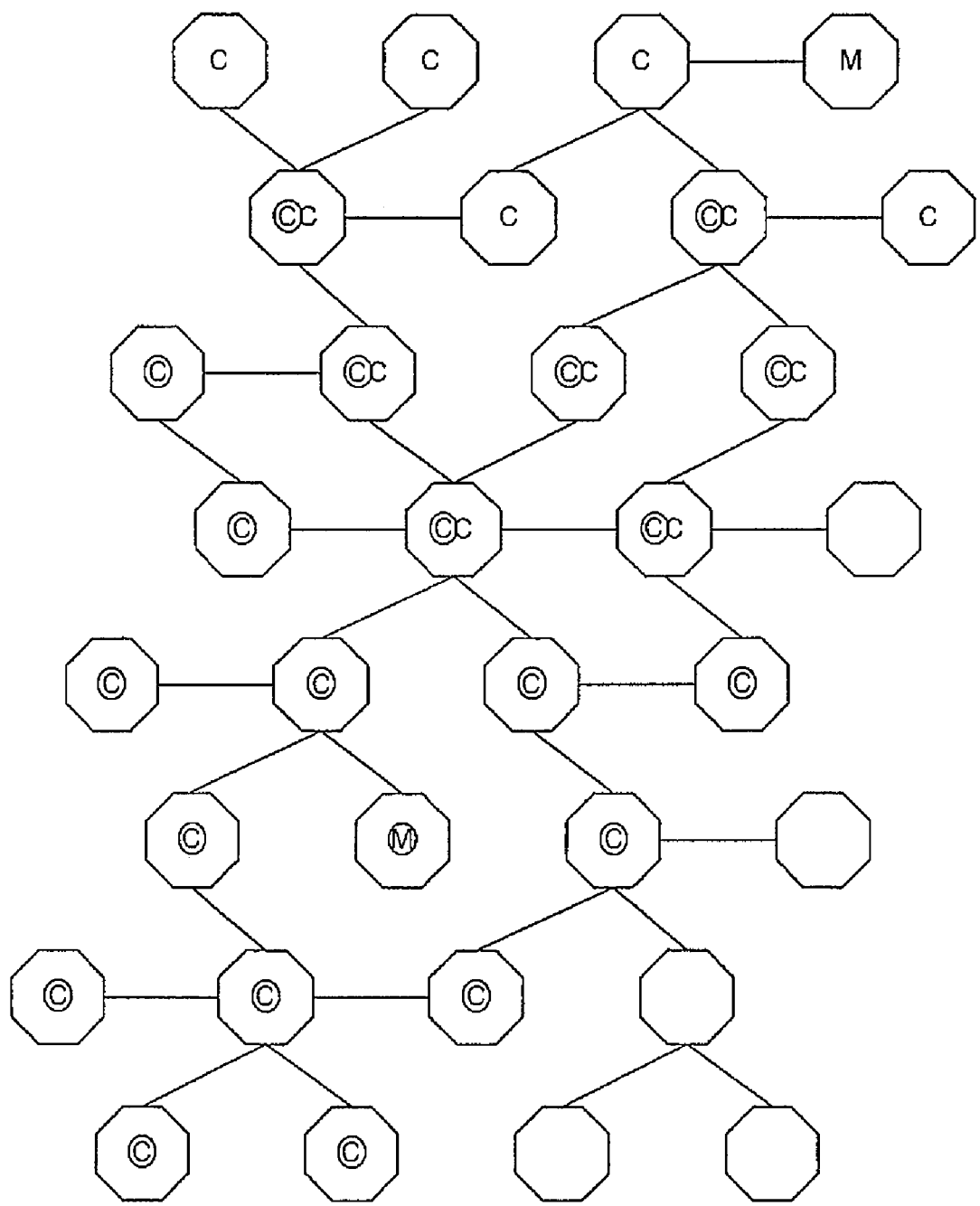

FIG. 7(b) illustrates local Browsing implemented in a 4-hop scatternet. In a scatternet, the information is not sent in broadcast style to every neighbouring node, but only to defined clients within each piconet. Again, master nodes (m, n) illustrate the nodes originating the information, i.e. a Proximity Home Page of the master, to the network, which is received by the clients (c). Clients (c) with circles on the letters receive the information sent by master n, and clients (c) without circle on the letters receive Information sent by master m.

Figure 7C:
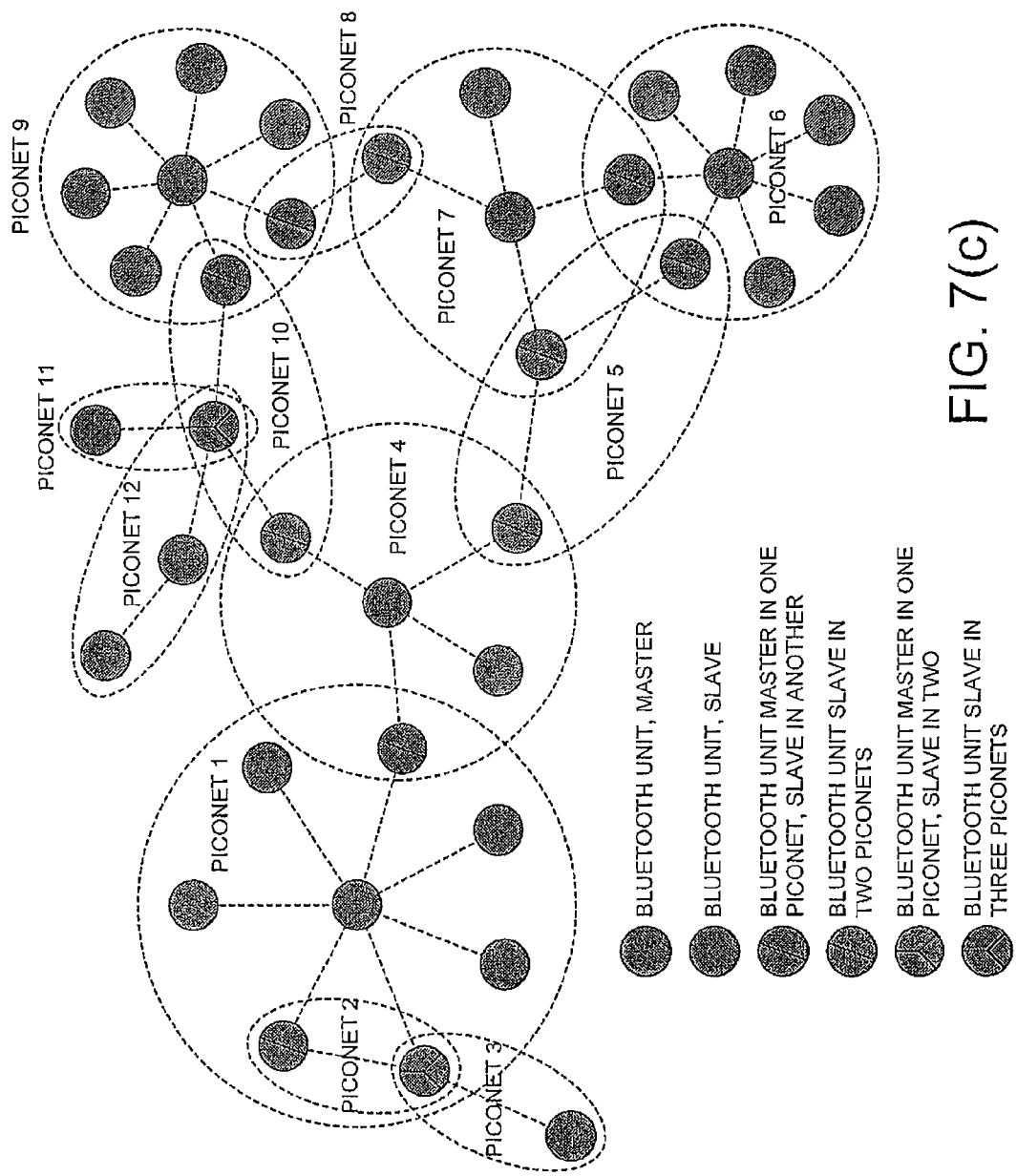

FIG. 7(c) illustrates a Bluetooth scatternet. As can be seen the Bluetooth scatternet is comprised of 12 Piconets, each having a master and at least one slave, some of the slaves being slaves in multiple piconets, and some slaves acting as masters in other piconets. This type of scatternet is well known by experts in Bluetooth environment area.

Thus the invention allows, for example, cellular phones, PDAs, access points or other devices with Bluetooth capability to form an ad hoc browsing network. Any other form of ad hoc radio communication may also be used. The modes of the network may be mobile or fixed or any combination thereof.

The size of the Proximity Homepages is preferably limited, in order to control and/or limit the amount of communication traffic.

The hop count is preferably limited or optimised to avoid blocking of the network, and to offer reasonable battery lifetime to mobile devices. The system may be adapted to 'prefer' nodes attached to power supplies in forwarding Proximity Homepages, in order to save battery operated modes.

The invention may be implemented in any device or terminal using appropriate software. For example, the invention may be implemented in Bluetooth enabled mobile phones using Symbian application software.

The invention, in creating an ad hoc network as described hereinabove, may be advantageously used in 'super distribution'. The distribution of Media (e.g. music, newspapers, books, games etc.) using Bluetooth access points is effective and fast. However its usefulness is limited due to the small coverage area. The local browsing technique enabled by the present invention makes it possible to advertise the access point with the help of proximity pages carried by around by persons passing the access point. People Who are interested in the access point may then approach it to directly access the service it offers. The advertisement of the Proximity homepages may be carried over several hops, but the Media distribution is preferably limited to a single hop, i.e. direct connection at the access point. Thus the hop count may vary in dependence on the type of information, and a single implementation may support multiple simultaneous hop counts.

More generally, the ad hoc network facilitated by the present invention may be used to guide potential customers to different access points, for example to a shop.

Figure 8A:
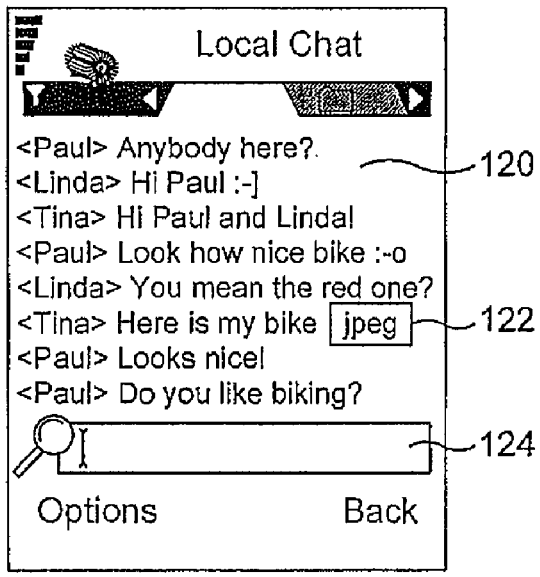
FIGS. 8(a) and 8(b) illustrate a local multimedia chatting session in accordance with a preferred embodiment of the invention.
Figure 8B:
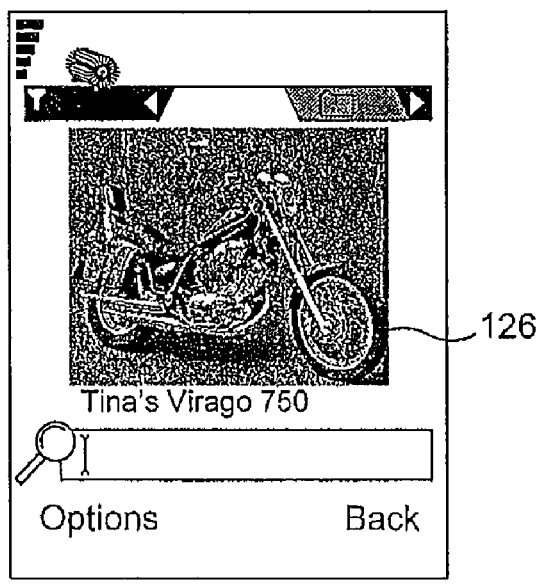

Another advantageous application of the present invention is local multimedia chatting, as illustrated by the examples of FIGS. 8(a) and 8(b). The local browsing technique can be used for delivering chatting messages to the proximity. Local chat messages may be text only, or may be multimedia messages. Referring to FIG. 8(a), messages 120 keep rolling up on the display as new messages are received from the proximity. Reference numeral 122 represents an attachment, for example a jpeg picture attachment or a music clip. FIG. 8(b) represents the opening of the picture attachment responsive to the selection of the attachment. The user may type their own message in a designated portion 124 of the display, and the message is then sent in the user's proximity.

Such multimedia chatting may utilise an integrated camera and microphone.

Figure 9:
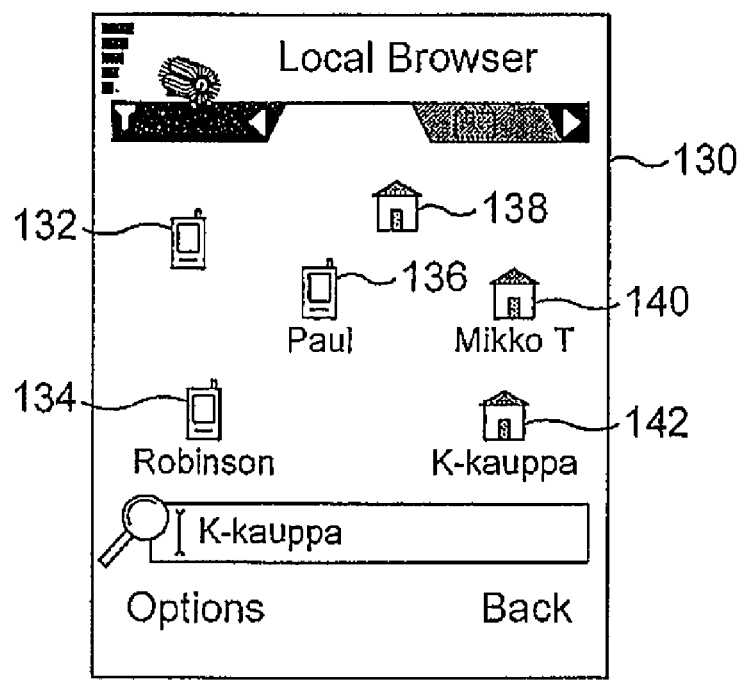
FIG. 9 illustrates a local browser in a preferred embodiment of the invention.

In a particular preferred embodiment, the local browser of a multimedia phone, for example, may contain a "network neighbourhood display" which shows all the users in the proximity area. This is illustrated by FIG. 9, which illustrates an example display 130 showing the geographical layout of the ad hoc users. Such a display depends upon the devices supporting location data. Alternatively, the users in the network may be shown as a list. By clicking a selected user, his/her proximity homepage may be downloaded and shown on the browser. In a preferred embodiment, the browsing of the home pages takes place from the terminals memory, and there is no time-consuming downloading required from the network or other nodes. As shown in Figure 130, the display illustrates the mobility characteristics of the users. Three mobile users 132, 134, 136 are displayed, and three fixed terminals 138, 140, 142 are displayed. The terminal 142 is highlighted as it represents the user of the device including the local browser 130.

In summary, the information in the Proximity homepage may typically include the same type of information as world wide web pages, and include (but are not limited to): the name, address, location, descriptions, and pictures of the user. The proximity page advantageously includes links to any information in the devices forming the ad hoc network or in the Internet. Links pointing to devices in the ad hoc network may be browsed within the ad hoc network. Links pointing to the Internet are browsed with other services, e.g. GPRS or access services.

The present invention offers many advantages. People are able to obtain information about each other and their surroundings that is not normally available, such as information about local services, the ability to browse adjacent people, things and services. The invention allows users to locate targets of interest in the locality.

The distribution of traffic of the proximity pages is minimised by using the "fetching" principle, as described for example in FIG. 5, where new proximity homepages are fetched from a neighbouring node based on a proximity homepage list received from that node. The new proximity homepage can be fetched either after information is received that such a new home page exists, or even only after the user wishes to review the specific proximity home page, This kind of "fetching" principle is power usage friendly, as the amount of data sent as background traffic can be optimised compared to the broadcast type of transmission, which may be an important aspect for mobile terminals with limited power supply.

When this principle is followed, home pages of nodes in n-hop proximity are always available from the direct neighbour. No routing is needed, and therefore overheads are low. No multi-hop connections are needed for acquiring pages, and this results in high data speed.

The invention has been described herein by way of reference to a particular, non-limiting example. However, the skilled person will appreciate that the example does not limit the invention. In particular the invention is not limited to any particular type of short-range communication. Furthermore, the term short-range is not limited in its meaning to a specific transmission range. The term short-range is intended to refer to communications, which are transmitted independent of a supporting network (e.g. a mobile communication network), on a direct device-to-device basis, preferably in a localised area.

The invention claimed is:

1. A method comprising:
receiving fetching information associated with a source user terminal at at least one destination user terminal from said source user terminal utilizing a short-range communication link in an ad hoc network, said fetching information identifying further information stored in the source user terminal;
utilizing the short-range communication link in the ad hoc network such that said at least one destination terminal uses said fetching information to fetch said further information from the source user terminal using said fetching information received from said source terminal; and
transmitting said fetching information from said at least one destination user terminal to at least one further terminal in said ad hoc network, so that said further information is distributed in said ad hoc network between said user terminals.

2. A method according to claim 1 wherein the short-range communication link is one of: a Bluetooth link; an infra-red link; or a WLAN link.

3. A method according to claim 1 wherein said fetching information transmitted from said at least one destination user terminal is received at said at least one further terminal.

4. A method according to claim 1, wherein the fetching information received from the source user terminal utilizing the short-range communication link in the ad hoc network is re-transmitted by a limited number of further terminals.

5. A method according to claim 1 wherein the further information is fetched from the source terminal with a hop count.

6. A method according to claim 5 wherein on receipt of the further information the hop count is reduced by one.

7. A method according to claim 6 wherein the fetching information is re-transmitted if the hop count is non-zero.

8. A method according to claim 1 wherein receiving fetching information utilizing the short-range communication link in the ad hoc network comprises receiving at the at least one destination user terminal fetching information that has been broadcast information from the source user terminal to the destination user terminal.

9. A method according to claim 1 wherein each user terminal includes an information index for storing an index of further information stored in the user terminal, wherein on receipt of a transmission, the transmission is accepted in dependence on the further information contained in the transmission not being identified in the information index.

10. A method according to claim 9 wherein said information index comprises identifier and version information for said further information.

11. A method according to claim 1 wherein each user terminal includes an information index for storing an index of further information transmitted by the user terminal, wherein a retransmission of the further information is prevented in dependence on the information index indicating the previous transmission of the further information.

12. A method according to claim 11 wherein said information index comprises identifier and version information for said further information.

13. A method according to claim 1 wherein the fetched further information is stored in the terminal memory.

14. A method according to claim 13 wherein stored further information is removed from the terminal memory in dependence on predefined parameters.

15. A method according to claim 14 wherein the stored further information is removed from the terminal memory in dependence on an elapsed time from being stored; an elapsed time from being refreshed; an elapsed time from being accessed; or an elapsed time set in a stored Proximity Home Page.

16. A method according to claim 1 wherein said further information is a web page associated with said source user terminal.

17. A method according to claim 16 wherein said web page is a Proximity Home Page.

18. A method according to claim 17 wherein additional information associated with a Proximity Home Page is fetched from the associated source user terminal.

19. A method according to claim 17 wherein additional information associated with a Proximity Home Page is fetched from the Internet.

20. A method according to claim 1 wherein the at least one destination user terminal requires the identified further information that the at least one destination user terminal does not have in its own memory.

21. A method according to claim 20 wherein the at least one destination user terminal fetches the required further information from the source user terminal.

22. A communication system comprising a plurality of terminals in an ad hoc network, in which: a source user terminal is adapted to transmit fetching information associated with said source user terminal utilizing a short-range communication link in the ad hoc network; said fetching information identifying further information stored in the source user terminal: a destination user terminal is adapted to receive said transmitted fetching information; and said destination user terminal is further adapted to utilize the short-range communication link in the ad hoc network to fetch further information from the source user terminal using said fetching information received from said source terminal; and said destination user terminal is further adapted to further transmit said fetching information to at least one further terminal in said ad hoc network.

23. A user terminal comprising:
a receiver adapted to receive fetching information associated with a source user terminal from said source user terminal utilizing a short-range communication link in the ad hoc network, said fetching information identifying further information stored in the source user terminal; and
a fetcher adapted to utilize the short-range communication link in the ad hoc network to fetch said further information from the source user terminal; and
a transmitter adapted to transmit said fetching information to at least one further terminal in said ad hoc network.

24. A user terminal according to claim 23 wherein the fetching information transmitted by the user terminal utilizing a short-range communication link in the ad hoc network or received at the user terminal includes an identification of the number of times the further information may be retransmitted.

25. A user terminal according to claim 24 wherein the fetcher is adapted to reduce the value of the retransmission identification number on fetching the further information.

26. A user terminal according to claim 25 wherein the user terminal transmits the received fetching information in dependence upon the value of the retransmission identification number.

27. A user terminal according to claim 26 wherein the user terminal transmits the received fetching information if the retransmission identification number is non-zero.

28. A user terminal according to claim 23 wherein the user terminal requires the identified further information that the user terminal does not have in its own memory.

29. A user terminal according to claim 28 wherein the fetcher is adapted to fetch the required further information from the source user terminal.

30. A user terminal comprising:
a receiving means adapted to receive fetching information associated with a source user terminal from said source user terminal utilizing a short-range communication link in an ad hoc network, said fetching information identifying further information stored in the source user terminal;
a fetching means adapted to utilize the short-range communication link in the ad hoc network to fetch said further information from the source user terminal; and
a transmitting means adapted to transmit said fetching information to at least one further terminal in said ad hoc network.

31. A method comprising:
transmitting fetching information associated with a source user terminal from said source user terminal to at least one destination user terminal utilizing a short-range communication link in an ad hoc network, said fetching information identifying further information stored in the source user terminal;
receiving a request at said source user terminal from said at least one destination user terminal utilizing the short-range communication link in the ad hoc network, said request being a request to fetch said further information; and
transmitting said further information from said source user terminal to said at least one destination user terminal in response to receiving said request utilizing the short-range communication link in the ad hoc network;
wherein said further information is transmitted from said source user terminal to said at least one destination user terminal with a hop count.

32. A user terminal comprising:
a transmitter adapted to transmit fetching information associated with said user terminal from said user terminal to at least one destination user terminal utilizing a short-range communication link in an ad hoc network, said fetching information identifying further information stored in said user terminal;
a receiver adapted to receive a request from said at least one destination user terminal utilizing the short-range communication link in the ad hoc network, said request being a request to fetch said further information; and
an information transmitter adapted to transmit said further information from said user terminal to said at least one destination user terminal in response to receiving said request utilizing the short-range communication link in the ad hoc network, wherein said further information is transmitted from said user terminal to said at least one destination user terminal with a hop count.

33. A user terminal comprising:
a transmitting means adapted to transmit fetching information associated with said user terminal from said user terminal to at least one destination user terminal utilizing a short-range communication link in an ad hoc network, said fetching information identifying further information stored in said user terminal;
a receiving means adapted to receive a request from said at least one destination user terminal utilizing the short-range communication link in the ad hoc network, said request being a request to fetch said further information; and
an information transmitting means adapted to transmit said further information from said user terminal to said at least one destination user terminal in response to receiving said request utilizing the short-range comnmunication link in the ad hoc network, wherein said further information is transmitted from said user terminal to said at least one destination user terminal with a hop count.

* * * * *